United States Patent
Srinivasan et al.

(10) Patent No.: US 8,369,325 B2
(45) Date of Patent: Feb. 5, 2013

(54) METHOD AND APPARATUS FOR PACKET CLASSIFICATION AND SPREADING IN A VIRTUALIZED SYSTEM

(75) Inventors: Arvind Srinivasan, San Jose, CA (US); Michael F. Speer, Mountain View, CA (US); Marcelino M. Dignum, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 406 days.

(21) Appl. No.: 12/494,498

(22) Filed: Jun. 30, 2009

(65) Prior Publication Data

US 2010/0329253 A1 Dec. 30, 2010

(51) Int. Cl.
*H04L 12/28* (2006.01)
*H04L 12/56* (2006.01)
(52) U.S. Cl. ........................................ 370/389; 370/392
(58) Field of Classification Search .................. 709/226, 709/225, 227, 230, 250; 370/250, 389–392
See application file for complete search history.

(56) References Cited

U.S. PATENT DOCUMENTS

| | | | |
|---|---|---|---|
| 6,175,874 B1 * | 1/2001 | Imai et al. | 709/238 |
| 7,813,366 B2 * | 10/2010 | Freimuth et al. | 370/419 |
| 8,009,682 B2 * | 8/2011 | Gopinath et al. | 370/401 |
| 2004/0177165 A1 * | 9/2004 | Masputra et al. | 709/250 |
| 2006/0251071 A1 * | 11/2006 | Oh et al. | 370/390 |
| 2010/0115174 A1 * | 5/2010 | Akyol et al. | 710/316 |
| 2010/0242106 A1 * | 9/2010 | Harris et al. | 726/15 |

* cited by examiner

*Primary Examiner* — Chuong T Ho
(74) *Attorney, Agent, or Firm* — Park, Vaughan, Fleming & Dowler LLP; Laxman Sahasrabuddhe (57) ABSTRACT

Some embodiments of the present invention provide a system for packet classification and spreading in a virtualized system. The system can use information in a packet's header to determine a destination system-image in the virtualized system, and a packet-spreading policy for the destination system-image. The system can determine a key using the information in a packet's header. Alternatively, the system can hash the information in the packet's header to obtain an index value. Next, the system can use the key or the index value to perform a lookup in a table which associates keys or index values with system images and/or packet-spreading policies. Once the destination system-image and the packet-spreading policy are determined, the system can deliver the packet to a thread on the destination system-image according to the packet-spreading policy.

17 Claims, 4 Drawing Sheets

METHOD AND APPARATUS FOR PACKET CLASSIFICATION AND SPREADING IN A VIRTUALIZED SYSTEM

BACKGROUND

1. Technical Field

This disclosure relates to computer networking. More specifically, this disclosure relates to methods and apparatuses for packet classification and spreading in a virtualized system.

2. Related Art

Rapid advances in computer technology have touched almost all aspects of our lives—from buying books to buying real estate, and from reading a newspaper to watching a movie. Virtualization is a recent trend in computing technology which provides a wide range of benefits, such as reducing capital expenditure, reducing operating costs, improving reliability, improving security, etc. Unfortunately, virtualization has created a number of challenges in high-performance systems.

In a high-performance system (e.g., a server), network packets are classified for processing by different processing elements which are usually tied to system-allocated resources (such as an operating system, platform, etc). Each processing element can be tied to a device abstraction, and the device abstraction could have multiple threads associated with it. A higher level policy is typically used to determine how load is to be spread among each of the hardware threads.

To ensure high resource utilization, the virtualized system should be able to dynamically change the association between a device abstraction and a thread. Further, the virtualized system should be able to dynamically change the load-sharing or packet-spreading policies based on ingress traffic characteristics. Moreover, in situations where a packet needs to be distributed to multiple device abstractions, the virtualized system should be able to apply different policies to packets depending on the device abstraction to which the packet is delivered. Additionally, most of the processing needs to be performed in hardware to improve performance. Unfortunately, achieving these system virtualization goals can be very challenging due to hardware resources constraints.

SUMMARY

One embodiment of the present invention provides a system for packet classification and spreading in a virtualized system. During operation, the system uses information in a packet's header to determine a destination system-image in the virtualized system and a packet-spreading policy for the destination system-image. Specifically, the system can hash the information in the packet's header to obtain an index value. Next, the system can use the index value to perform a lookup in a table which associates index values with system images and/or packet-spreading policies. Once the system determines the destination system-image and the packet-spreading policy, the system can deliver the packet to a thread on the destination system-image according to the packet-spreading policy.

In some embodiments, the information in the packet's header can include a unicast or multicast address. The system can hash the unicast or multicast address to determine an index value. Next, the system can use the index value to perform a lookup in a table to determine the system images that have subscribed to the multicast address, and their respective packet-spreading policies. Next, the system can deliver the multicast packet to each system image that subscribed to the multicast address according to the system image's packet-spreading policy.

In some embodiments, the system can receive, from a destination system-image, the packet-spreading policy and the information in the packet's header for which the policy is to be used. Next, the system can hash the information to obtain an index value. The system can then use a table to associate the index value with the packet-spreading policy and the destination system-image. The system can then use the table for performing packet classification and spreading.

It is desirable to ensure that a misbehaving or malfunctioning system image does not impact other system images in the virtualized system. Specifically, in some embodiments of the present invention, the system can determine if a destination system-image is accepting packets. If so, the system can deliver packets to the destination system-image according to the destination system-image's packet-spreading policy. However, if the destination system-image is not responding, or is otherwise behaving abnormally, the system may ignore the destination system-image and continue delivering packets to other system images. In this manner, the system can isolate the misbehaving or malfunctioning destination system-image.

Note that embodiments of the present invention can enable each system image in a virtualized system to have a different packet-spreading policy for each type of packet the system image receives. The packet-spreading policy of a particular system image can be dynamically changed by modifying the corresponding entry in the table. Further, entries of the table can be modified dynamically to reflect changes in multicast group memberships. Additionally, by using a fast hashing operation, and by using a fast table lookup operation, embodiments of the present invention can ensure that packet classification and spreading is performed with a high throughput.

DETAILED DESCRIPTION

The following description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data, so that when a computer system executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

Virtualized System

Figure 1:
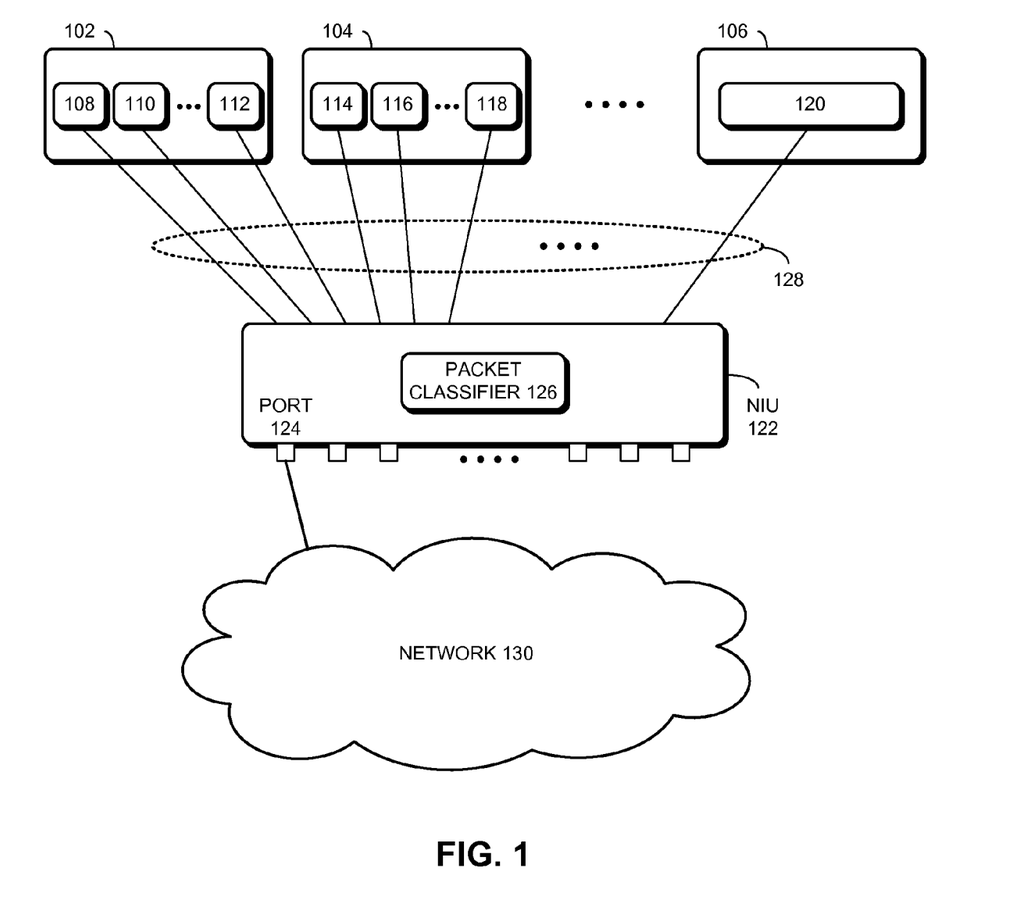
FIG. 1 illustrates a virtualized system in accordance with an embodiment of the present invention.

FIG. 1 illustrates a virtualized system in accordance with an embodiment of the present invention. The virtualized system shown in FIG. 1 is for illustration purposes only and is not intended to limit the present invention to the forms disclosed.

The virtualized system illustrated in FIG. 1 includes a set of hosts, such as hosts 102, 104, and 106. A host can generally be any computing system that supports one or more hardware and/or software threads. Specifically, a host can include one or more processors, and each processor can include one or more cores.

Each host can support one or more system images. According to one definition, a system image is a software component, such as a general-purpose operating system (OS), to which specific virtual and physical devices can be assigned.

A host that does not support virtualization may be able to support only one operating system instance. For example, host 106 may not support virtualization, and hence, host 106 has been illustrated as having one operating system instance, namely, system image 120.

On the other hand, a host that supports virtualization can have one or more operating system instances that operate independently of one another. Each system image, e.g., operating system instance, in a host that supports virtualization may be oblivious to the fact that the host's hardware resources are being shared among multiple operating system instances.

For example, host 102 has multiple system images, such as system images 108, 110, and 112. Similarly, host 104 has multiple system images, such as system images 114, 116, and 118. Note that the number of system images in each host that supports virtualization can be different. For example, the number of system images in host 102 may be different from the number of system images in host 104. Additionally, each host or system image may support a different number of hardware or software threads. For example, system image 108 may support four threads, whereas system image 110 may support eight threads.

Embodiments of the present invention can be used with one or more hosts regardless of whether or not the hosts support virtualization, and regardless of the number of hardware or software threads that each host or system image supports.

A system image in a virtualized system, e.g., system image 108, may communicate with network 130 via network interface unit (NIU) 122. Network 130 can generally include one or more wired or wireless communication channels capable of coupling together computing devices and/or systems. This includes, but is not limited to, a local area network, a wide area network, an intranet, the Internet, or a combination of networks.

NIU 122 can generally be any hardware-based and/or software-based device or system that enables a system image, e.g., system image 108, to communicate with network 130. Specifically, NIU 122 can include one or more ports which NIU 122 uses to communicate with other systems. For example, NIU 122 can use port 124 to communicate with other systems or devices in network 130. NIU 122 can use communication mechanism 128 to communicate with a system image in the virtualized system, e.g., system image 108. Communication mechanism 128 can be any wired or wireless mechanism capable of coupling together different components of a virtualized system. Specifically, communication mechanism 128 can be a high-bandwidth communication system that has been designed for communications between a processor, memory, and peripheral devices. For example, communication mechanism 128 can be a single-root or a multi-root Peripheral Component Interconnect Express (PCIe) fabric.

Some embodiments of the present invention enable each system image, e.g., system image 108, to treat the network resources on the virtualized system, e.g., NIU 122, as its own. In other words, some embodiments of the present invention allow system images to share network resources in such a manner that the system images are oblivious to the fact that the network resources are being shared among multiple system images.

NIU 122 can include a plurality of components which perform a variety of functions. Specifically, NIU 122 can include packet classifier 126. Packet classifier 126 can help NIU 122 to distribute packets to different threads in the virtualized system.

Some embodiments of the present invention enable each system image to treat packet classifier 126 as its own. Note that each system image may have different packet classification and spreading policies. Further, a system image may have different packet classification and spreading policies for different types of packets. Specifically, some embodiments of the present invention enable each system image to treat packet classifier 126 as its own, even though the packet classification and spreading policy may differ from one system image to the next, and from one packet type to the next.

Figure 2:
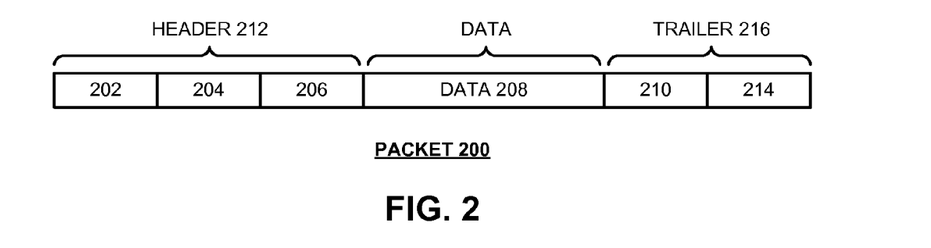
FIG. 2 illustrates a packet in accordance with an embodiment of the present invention.

FIG. 2 illustrates a packet in accordance with an embodiment of the present invention. The packet format shown in FIG. 2 is for illustration purposes only and is not intended to limit the present invention to the forms disclosed.

Packet 200 can generally be divided into three sections: header 212, data or payload 208, and trailer 216. Each of these sections can include a plurality of fields. Specifically, some fields in header 212 can include information that is used for routing the packet. For example, header 212 can include protocol headers 202, 204, and 206. Each protocol header can include an address for a particular protocol. For example, protocol header 202 can include a layer two (L2) protocol address, e.g., an Ethernet address; protocol header 204 can include a layer three (L3) protocol address, e.g., an Internet Protocol (IP) address; and protocol header 206 can correspond to a transport layer port, e.g., a Transmission Control Protocol (TCP) port. In addition to containing addresses, a protocol header can include various control fields which can be used by the protocol for a variety of purposes.

The term "information in a packet" can generally refer to one or more bits from one or more fields in a packet. Similarly, the term "information in a packet's header" can generally refer to one or more bits from one or more fields in the packet's header. For example, the information in a packet's header can be one or more bits of a packet's L2 unicast or multicast address. Alternatively, the information in a packet's header can be one or more bits of a packet's L2 address and the packet's L3 address.

Data section 208 can include a plurality of data fields which can contain data that is being communicated in the packet. Trailer 216 can include one or more fields, such as fields 210 and 214, which are placed at the end of packet 200. For example, field 214 can be a cyclic redundancy check (CRC) field.

In general, packet classifier 126 can use any information in any of the fields of a packet to determine which thread to deliver the packet to. In some embodiments though, packet classifier 126 uses information in a packet's header, e.g., packet 200's header, to determine which thread to deliver the packet to. For example, packet classifier 126 can use packet 200's L2 address to deliver packet 200 to a specific thread on a specific system image.

Some embodiments of the present invention allow system images and/or hosts to be hot-swapped. In other words, a host or a system image may be replaced by another host or system image during operation without affecting the rest of the virtualized system. In such scenarios, the packet classification and spreading policy needs to be updated dynamically. Further, while the host or the system image is being hot-swapped, the packet classifier must continue processing packets that are destined to other hosts and/or system images. Some embodiments of the present invention ensure that hot-swapping a host or a system image does not affect the performance of other hosts or system images in the virtualized system.

Note that the multicast address space can be very large. For example, a layer two multicast address space can be 48 bits. Further, one or more system images may join a particular multicast group. Moreover, within a system image, the multicast packets may need to be delivered to one or more threads according to a packet-spreading policy. Some embodiments of the present invention provide techniques and systems for distributing multicast packets to threads in a virtualized system according to different packet classification and spreading policies.

Packet Classification and Spreading in a Virtualized System

Figure 3:
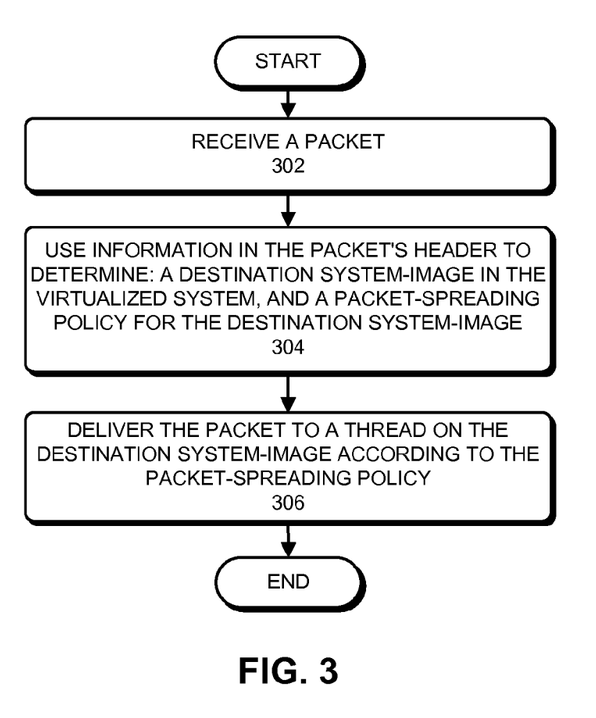
FIG. 3 presents a flowchart that illustrates a process for packet classification and spreading in a virtualized system in accordance with an embodiment of the present invention.

FIG. 3 presents a flowchart that illustrates a process for packet classification and spreading in a virtualized system in accordance with an embodiment of the present invention.

The process can begin by receiving a packet (block 302). For example, packet 200 may be received at port 124 of NIU 122. This packet may then be processed by packet classifier 126.

Specifically, the system can use information in the packet's header to determine: a destination system-image in the virtualized system, and a packet-spreading policy for the destination system-image (block 304).

For example, packet classifier 126 can use one or more bits in header fields 202, 204, and/or 206 to identify the destination system-image to which the packet is destined, and a packet-spreading policy that is to be used for spreading packets among different threads in the destination system-image.

Next, the system can deliver the packet to a thread on the destination system-image according to the packet-spreading policy (block 306).

The system can deliver the packet to a destination system-image by assigning one or more direct memory access (DMA) channels to the packet. Note that each DMA channel may be associated with a thread in a system image. Once the system assigns a DMA channel to a packet, the DMA channel can then be used to transfer the packet from the NIU to a memory buffer that is being used by a thread in a system image. Hence, by assigning a DMA channel to a packet, the system effectively delivers the packet to a particular thread in a particular system image.

Note that packet classifier 126 is shared among multiple system images. Hence, if a particular system image is not responding, or if the system image is malfunctioning, the unavailable system image should not affect packet delivery to other system images. Packet classifier 126 can use the system image availability information to determine whether to deliver a packet to a system image or not.

Figure 4A:
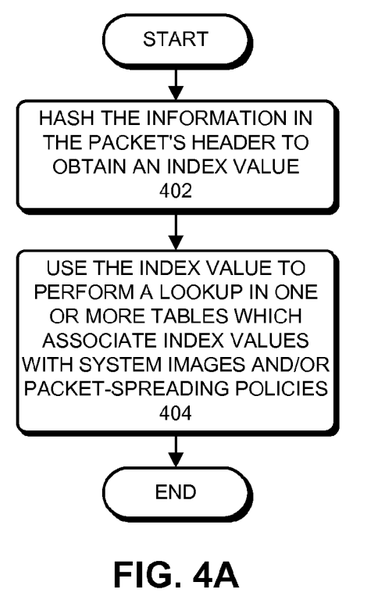
FIG. 4A presents a flowchart that illustrates a process for determining the destination system-image and the packet-spreading policy for a packet in accordance with an embodiment of the present invention.

FIG. 4A presents a flowchart that illustrates a process for determining the destination system-image and the packet-spreading policy for a packet in accordance with an embodiment of the present invention.

The process can begin by hashing the information in the packet's header to obtain an index value (block 402). Next, the system can use the index value to perform a lookup in one or more tables which associate index values with system images and/or packet-spreading policies (block 404).

Figure 4B:
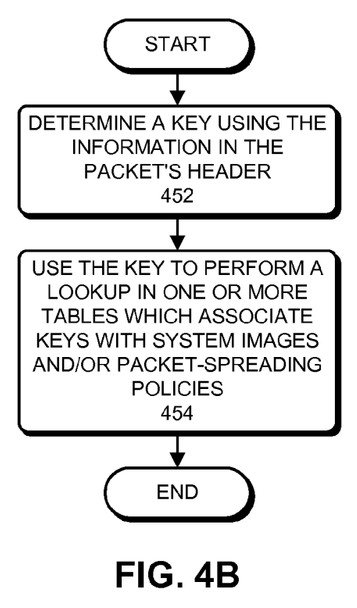
FIG. 4B presents a flowchart that illustrates a process for determining the destination system-image and the packet-spreading policy for a packet in accordance with an embodiment of the present invention.

Instead of using a hash based approach, the system can use an approach based on key matching to determine the destination system image and the packet classification and spreading policy. Specifically, instead of hashing information in a packet's header to obtain an index value so that a table lookup can be performed, the system may create a key using one or more fields in a packet's header, and then use the key to perform a table lookup operation.

FIG. 4B presents a flowchart that illustrates a process for determining the destination system-image and the packet-spreading policy for a packet in accordance with an embodiment of the present invention.

The process can begin by determining a key using the information in the packet's header (block 452). For example, the system may concatenate two fields in the packet's header to create the key. Next, the system can use the key to perform a lookup in one or more tables which associate keys with system images and/or packet-spreading policies (block 454).

Protocol addresses can be large, e.g., an L2 multicast address can be 48 bits. Some embodiments of the present invention hash the information in the packet's header (e.g., the L2 multicast address) to obtain a smaller index value (e.g., 8-bit index value) before performing a lookup on a table. For example, the process can compute a cyclic redundancy check (CRC) of the information in the packet's header to determine an 8-bit index value.

Figure 5A:
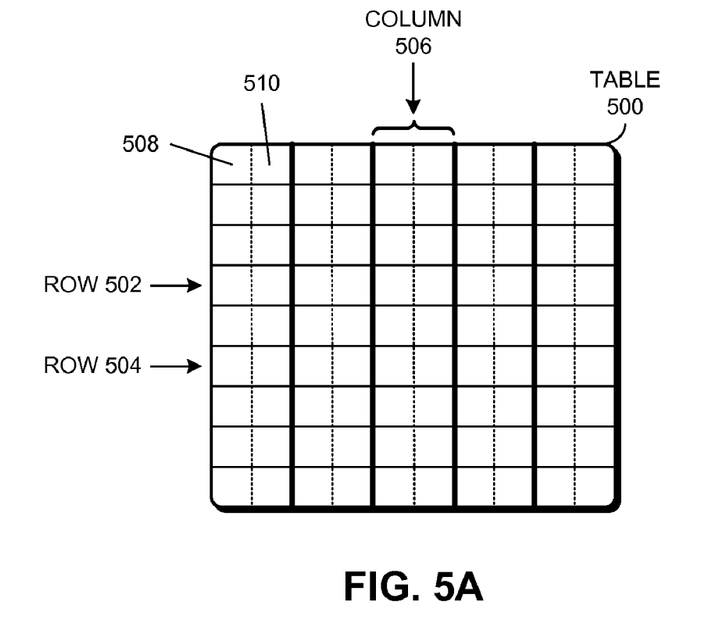
FIG. 5A illustrates a table which can be used to determine the destination system-image and the packet-spreading policy in accordance with an embodiment of the present invention.

FIG. 5A illustrates a table which can be used to determine the destination system-image and the packet-spreading policy in accordance with an embodiment of the present invention.

Table 500 can include a number of table elements which are organized using a set of rows, such as rows 502 and 504, and a set of columns, such as column 506. Each column can correspond to a system image, and each row can correspond to a key or an index value which, in turn, corresponds to specific information (e.g., a specific unicast or multicast address) in the packet's header.

Each table element can include one or more fields. In table 500, each table element includes two fields. For example, the top left corner element in table 500 includes fields 508 and 510.

Field 508 can indicate whether the system image corresponding to this column is supposed to receive the packet. For example, field 508 may be a one-bit field which specifies whether the system image associated with this column has subscribed to the multicast address associated with this row.

Field 510 can include an opcode which can indicate the spreading policy to use while delivering the packet to the system image. Specifically, field 510 can be an n-bit field which identifies the packet-spreading policy to use when delivering the packet to the system image.

In this manner, embodiments of the present invention can enable each system image to have a different packet-spreading policy for each type of packet it receives. Furthermore, a packet-spreading policy for a particular system image can be dynamically changed by modifying the corresponding entry in table 500. Further, entries of table 500 can be modified dynamically to reflect changes in multicast group memberships. Additionally, by using a fast hashing technique, and by using a fast table lookup operation, the system can ensure that packet classification and spreading is performed in an efficient manner. Further, if a system image changes its state (e.g., if the system image becomes unavailable during an OS reboot), embodiments of the present invention ensure that the state change does not affect packet delivery to other system images.

Note that a packet classification and spreading policy can specify a number of parameters for processing packets. For example, a packet classification and spreading policy may specify which VLAN (virtual local area network) a system image belongs to, how to spread packets among threads on a system image, what kind of load-balancing policy should be used for directing traffic to the system image, what kinds of packets should be delivered to the system image, which system images have subscribed to a particular multicast address, etc.

The system can use various spreading policies to deliver packets. For example, one packet-spreading policy can be to deliver the packet to a randomly selected thread from a set of threads on the destination system-image. Specifically, the system may randomly select a DMA channel from a set of DMA channels, where each DMA channel may correspond to a particular thread. Another spreading policy can be to deliver the packet to all threads in a set of threads on the destination system-image. In yet another spreading policy, the packet classifier may deliver the packet to a particular thread on the destination system-image. It will be apparent that a variety of spreading policies can be defined for delivering packets on a system image. Note that the above-described examples of spreading policies are for illustration purposes only and are not intended to limit the present invention to the forms disclosed.

Figure 5B:
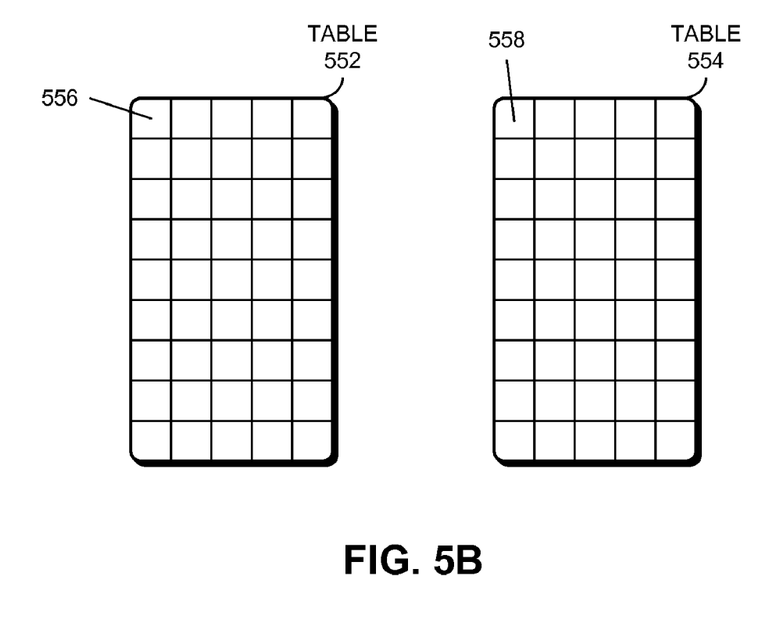
FIG. 5B illustrates two tables which together can be used to determine the destination system-image and the packet-spreading policy in accordance with an embodiment of the present invention.

In some embodiments, the system can use two tables instead of one table: a first table to determine which system image to deliver the packet to, and a second table to determine the packet-spreading policy to use. FIG. 5B illustrates two tables which together can be used to determine the destination system-image and the packet-spreading policy in accordance with an embodiment of the present invention.

Table 552 can be used to determine the destination system-image, and table 554 can be used to determine the packet-spreading policy. As before, the rows in these tables correspond to the index value that was computed using the information in the packet's header. For example, elements 556 and 558 may correspond to a particular unicast or multicast address because they have the same row number. The columns in these tables correspond to a system image. For example, the leftmost column in these tables may correspond to system image 108. Hence, table elements 556 and 558 may correspond to the same system image because they have the same column number. Once the system determines the index value using the information in the packet's header, the system can then determine the destination system-image and the packet-spreading policy using tables 552 and 554, respectively.

The table-based approaches shown in FIGS. 5A and 5B are for illustration purposes only and are not intended to limit the invention to the forms disclosed. In general, the system can use any technique for associating information in the packet's header with the destination system image and the packet classification and spreading policy.

Figure 6A:
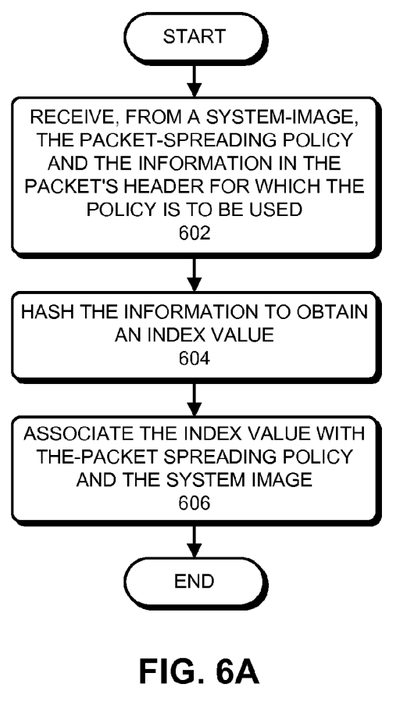
FIG. 6A presents a flowchart that illustrates a process for a system image to specify that a particular packet-spreading policy should be used for packets that have particular information in the packet's header in accordance with an embodiment of the present invention.

FIG. 6A presents a flowchart that illustrates a process for a system image to specify that a particular packet-spreading policy should be used for packets that have particular information in the packet's header in accordance with an embodiment of the present invention.

The process can begin by receiving, from a system image, a packet-spreading policy and the information in the packet's header for which the policy is to be used (block 602). If the packet-spreading policy is not received from the system image for which it is to be used, the process may explicitly receive the identity of the system image for which the packet-spreading policy is to be used.

Next, the system can hash the information to obtain an index value (block 604).

The system can then associate the index value with the packet-spreading policy and the system-image (block 606). For example, the system can use table 500 to associate the index value with the packet-spreading policy and the destination system-image.

If the system uses a key-matching based approach, the system can associate a key with the system-image and the packet-spreading policy.

Figure 6B:
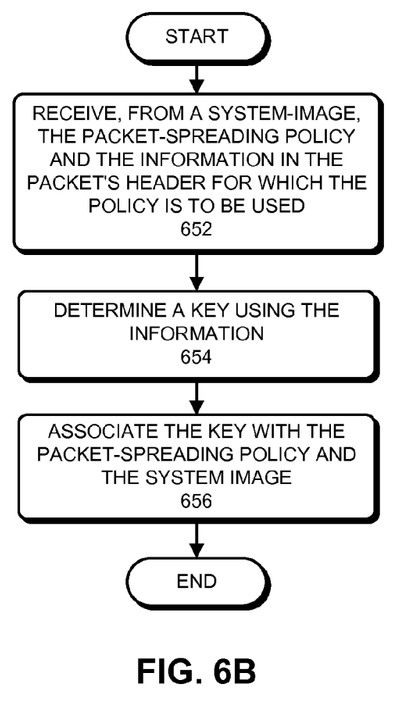
FIG. 6B presents a flowchart that illustrates a process for a system image to specify that a particular packet-spreading policy should be used for packets that have particular information in the packet's header in accordance with an embodiment of the present invention.

FIG. 6B presents a flowchart that illustrates a process for a system image to specify that a particular packet-spreading policy should be used for packets that have particular information in the packet's header in accordance with an embodiment of the present invention.

The process can begin by receiving, from a system image, a packet-spreading policy and the information in the packet's header for which the policy is to be used (block 652). Next, the system can determine a key using the information (block 654). The system can then associate the key with the packet-spreading policy and the system-image (block 656). For example, the system can use table 500 to associate the key with the packet-spreading policy and the destination system-image.

For example, system image 108 can provide an L2 unicast or multicast address to NIU 122, and specify the packet-spreading policy that should be used to spread packets among the different threads on system image 108. NIU 122 can configure components in the system and/or configure packet classifier 126 so that the L2 unicast or multicast address is associated with system image 108 and the packet-spreading policy. For example, NIU 122 can use a table, such as table 500, to associate the L2 unicast or multicast address with the packet-spreading policy and system image 108.

When packet 200 is received on port 124, NIU 122 can send relevant portions of packet 200 (e.g., packet 200's L2 address) to packet classifier 126 for classification and spreading purposes. Packet classifier 126 can use the information (e.g., packet 200's L2 address) to determine whether packet 200 should be delivered to a thread on system image 108. If packet classifier 126 determines that packet 200 should be delivered to a thread on system image 108, packet classifier 126 can then select a thread on system image 108 according to the packet-spreading policy that system image 108 had provided to NIU 122. Next, packet classifier 126 can deliver the packet to the selected thread (e.g., by assigning a DMA channel to the packet).

Figure 7:
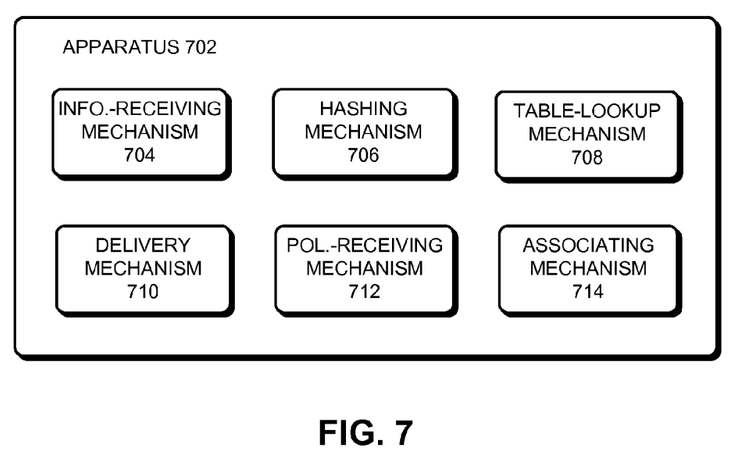
FIG. 7 illustrates an apparatus for packet classification and spreading in accordance with an embodiment of the present invention.

FIG. 7 illustrates an apparatus for packet classification and spreading in accordance with an embodiment of the present invention.

Apparatus 702 can comprise a number of mechanisms which may communicate with one another via a wired or wireless communication channel. Apparatus 702 may be realized using one or more integrated circuits, and it may be integrated in a computer system, or it may be realized as a separate device which is capable of communicating with other computer systems and/or devices. In some embodiments, apparatus 702 can be packet classifier 126.

Apparatus 702 can comprise information-receiving mechanism 704, hashing mechanism 706, table-lookup mechanism 708, delivery mechanism 710, policy-receiving mechanism 712, and associating mechanism 714.

Policy-receiving mechanism 712 may be configured to receive, from the destination system-image, the packet-spreading policy and the information in the packet's header for which the policy is to be used. Hashing mechanism 706 may be configured to hash the information in the packet's header to obtain an index value. Associating mechanism 714 may be configured to associate the index value with the packet-spreading policy and the destination system-image. Information-receiving mechanism 704 may be configured to receive information in a packet's header. Table-lookup mechanism 708 may be configured to use the index value to perform a lookup in a table to determine a destination system-image and a packet-spreading policy. Delivery mechanism 710 may be configured to deliver the packet to the destination system-image according to the packet-spreading policy. Note that, in some embodiments, hashing mechanism 706 and table lookup mechanism 708 can be part of a determining mechanism (not shown in FIG. 7) which is configured to use information in a packet's header to determine a destination system-image and a packet-spreading policy. Alternatively, the determining mechanism may include a key-creating mechanism configured to create a key using information in the packet's header, and a table lookup mechanism configured to use the key to lookup a destination system-image and a packet-spreading policy.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A hardware-implemented method for packet classification and spreading in a virtualized system, the method comprising:
    receiving, from a destination system-image in the virtualized system, at least one of a packet-spreading policy and an indication of information in received packet headers for which the packet-spreading policy is to be used, wherein the packet-spreading policy is used to determine how to spread packets that are to be sent to the destination system-image from which the packet-spreading policy was received, the spreading comprising sending a packet to, from a set of threads on the destination system-image, one of: a randomly selected thread, all threads, or a particular thread;
    using information in the packet's header to determine:
        the destination system image, and
        the packet-spreading policy for the destination system-image; and
    delivering the packet to a thread on the destination system-image according to the packet-spreading policy.

2. The hardware-implemented method of claim 1, wherein the information in the packet's header includes a unicast address.

3. The hardware-implemented method of claim 1, wherein the information in the packet's header includes a multicast address.

4. The hardware-implemented method of claim 1, wherein using the information in the packet's header to determine the destination system-image comprises:
    determining a key using the information in the packet's header; and
    using the key to perform a lookup in a table which associates keys with system images.

5. The hardware-implemented method of claim 1, wherein using the information in the packet's header to determine the packet-spreading policy comprises:
    determining a key using the information in the packet's header; and
    using the key to perform a lookup in a table which associates keys with packet-spreading policies.

6. The hardware-implemented method of claim 1, wherein using the information in the packet's header to determine the destination system-image comprises:
    hashing the information in the packet's header to obtain an index value; and
    using the index value to perform a lookup in a table which associates index values with system images.

7. The hardware-implemented method of claim 1, wherein using the information in the packet's header to determine the packet-spreading policy comprises:
    hashing the information in the packet's header to obtain an index value; and
    using the index value to perform a lookup in a table which associates index values with packet-spreading policies for system images.

8. The hardware-implemented method of claim 1, wherein prior to using the information in the packet's header to determine the destination system-image and the packet-spreading policy, the method comprises:
  determining a key using the information; and
  associating the key with the packet-spreading policy and the destination system-image.

9. The hardware-implemented method of claim 1, wherein prior to using the information in the packet's header to determine the destination system-image and the packet-spreading policy, the method comprises:
  hashing the information to obtain an index value; and
  associating the index value with the packet-spreading policy and the destination system-image.

10. A network interface unit, comprising:
  a port configured to receive a packet from a network; and
  a packet classifier configured to:
    receive, from a destination system-image in a virtualized system, at least one of a packet-spreading policy and an indication of information in received packet headers for which the packet-spreading policy is to be used, wherein the packet classifier is configured to use the packet-spreading policy to determine how to spread packets that are to be sent to the destination system-image from which the packet-spreading policy was received, the spreading comprising sending the packet to, from a set of threads on the destination system-image, one of: a randomly selected thread, all threads, or a particular thread;
    use the information in the packet's header to determine:
      the destination system-image and the packet-spreading policy for the destination system-image; and
    deliver the packet to a thread on the destination system-image according to the packet-spreading policy.

11. The network interface unit of claim 10, wherein the information in the packet's header includes a unicast address.

12. The network interface unit of claim 10, wherein the information in the packet's header includes a multicast address.

13. The network interface unit of claim 10, wherein the packet classifier is configured to:
  determine a key using the information in the packet's header; and
  use the key to perform a lookup in a table which associates keys with system images.

14. The network interface unit of claim 10, wherein the packet classifier is configured to:
  determine a key using the information in the packet's header; and
  use the key to perform a lookup in a table which associates keys with packet-spreading policies.

15. The network interface unit of claim 10, wherein the packet classifier is configured to:
  hash the information in the packet's header to obtain an index value; and
  use the index value to perform a lookup in a table which associates index values with system images.

16. The network interface unit of claim 10, wherein the packet classifier is configured to:
  hash the information in the packet's header to obtain an index value; and
  use the index value to perform a lookup in a table which associates index values with packet-spreading policies for system images.

17. A packet classifier, comprising:
  an information-receiving mechanism configured to receive information in a packet's header;
  a receiving mechanism configured to receive, from a destination system-image in a virtualized system, at least one of a packet-spreading policy and an indication of information in received packet headers for which the packet-spreading policy is to be used, wherein the packet-spreading policy is used to determine how to spread packets that are to be sent to the destination system-image from which the packet-spreading policy was received, the spreading comprising delivering the packet to, from a set of threads on the destination system-image, one of: a randomly selected thread, all threads, or a particular thread;
  a determining mechanism configured to use the information in the packet's header to determine the destination system-image and the packet-spreading policy; and
  a delivery mechanism configured to deliver the packet to the destination system-image according to the packet-spreading policy.

* * * * *